(12) United States Patent
Mabuchi

(10) Patent No.: US 6,707,193 B2
(45) Date of Patent: Mar. 16, 2004

(54) MINIATURE MOTOR WITH VIBRATOR SECURED TO AN IRREGULAR PORTION OF THE MOTOR SHAFT

(75) Inventor: Takaichi Mabuchi, Matsudo (JP)

(73) Assignee: Mabuchi Motor Co., Ltd., Matsudo (JP)

( * ) Notice: Subject to any disclaimer, the term of this patent is extended or adjusted under 35 U.S.C. 154(b) by 152 days.

(21) Appl. No.: 09/946,957

(22) Filed: Sep. 6, 2001

(65) Prior Publication Data

US 2002/0047375 A1 Apr. 25, 2002

(30) Foreign Application Priority Data

Sep. 11, 2000 (JP) ...................... P2000-274283

(51) Int. Cl.[7] .................. H02K 7/065; H02K 7/075; B06B 1/016; B06B 1/06
(52) U.S. Cl. .................... 310/81; 29/505; 29/507; 74/61
(58) Field of Search ............. 310/81, 51; 29/505, 29/515, 507; 403/247; 74/61, 570

(56) References Cited

U.S. PATENT DOCUMENTS

| 3,757,148 A | * | 9/1973 | Phillibert | 310/81 |
| 4,684,839 A | * | 8/1987 | Fujisaki et al. | 310/154 |
| 5,793,133 A | * | 8/1998 | Shiraki et al. | 310/81 |
| 6,081,052 A | * | 6/2000 | Hosoe et al. | 310/42 |
| 6,084,328 A | * | 7/2000 | Yamashita et al. | 310/90 |
| 6,234,414 B1 | * | 5/2001 | DeVitis et al. | 241/30 |

FOREIGN PATENT DOCUMENTS

| JP | 4-13860 | 3/1992 | | H04B/7/26 |
| JP | 7-16573 | 3/1995 | | H02K/7/075 |
| JP | 7-107699 | 4/1995 | | H02K/7/075 |
| JP | 7-35500 | 8/1995 | | H02K/7/075 |
| JP | 8-196054 | * 7/1996 | | H02K/7/075 |
| JP | 9-149592 | * 6/1997 | | H02K/7/075 |
| JP | 11-127553 | * 5/1999 | | H02K/7/065 |
| JP | 2000-226632 | * 8/2000 | | H02K/7/075 |
| JP | 2002-079179 | * 3/2002 | | B06B/1/04 |

* cited by examiner

*Primary Examiner*—Karl Tamai
(74) *Attorney, Agent, or Firm*—Armstrong, Kratz, Quintos, Hanson & Brooks, LLP.

(57) ABSTRACT

In a miniature electric motor for generating vibration, an output portion of a rotary shaft is formed into an irregular shape in cross-section other than a circular shape in cross-section. An engaging hole having a predetermined shape in cross-section, which corresponds to the irregular shape in cross-section of the output portion and which makes a vibrator to be kept under a relatively non-rotatable condition to the rotary shaft, is formed in the vibrator. The output portion is engaged with the engaging hole and the vibrator is positioned and held in a thrust direction relative to the output portion to thereby fix the vibrator to the rotary shaft. This motor is used as a vibration generator for a mobile phone and the like.

24 Claims, 6 Drawing Sheets

MINIATURE MOTOR WITH VIBRATOR SECURED TO AN IRREGULAR PORTION OF THE MOTOR SHAFT

BACKGROUND OF THE INVENTION

1. Field of the Invention

The present invention relates to a miniature electric motor for generating vibration used as a vibration generator, such as a mobile phone.

2. Description of the Related Art

In some current portable type telecommunication devices, such as mobile phones (cellular phone), a mechanism for paging a specific person by utilizing vibration in order not to cause troubles to other persons in the neighborhood of him or her instead of generating paging sound has been extensively used.

A miniature electric motor for generating vibration is provided in such a portable type telecommunication device. In such a motor, a rotary shaft is inserted into a hole of a vibrator so that the vibrator is mounted on the motor.

While the motor rotates, the rotary shaft vibrates due to imbalance of the center of gravity of the vibrator. Then, the motor as a whole vibrates to thereby vibrate the portable type telecommunication device.

The rotary shaft of the motor has a circular shape in cross-section and has to stand against the vibration. Accordingly, there have conventionally been proposed various approaches for technical means for fixing the vibrator to the rotary shaft. In many cases, the vibrator is crimped and plastically deformed so that the vibrator may be fixed to the rotary shaft. As another technical approach, the rotary shaft is press-fitted in a hole, having a circular shape in cross-section, of a vibrator.

As still another technique, an annular recess portion is formed around an overall circumferential area of the rotary shaft. Then, a crimped portion of the vibrator is gripped in the recess portion and is plastically deformed to enter through the outer circumferential surface of the rotary shaft. Thus, the retaining strength of the vibrator to the rotary shaft may be obtained.

In these related art, assuming that the rotary shaft has a circular shape in cross-section, a variety of approaches have been taken on the vibrator side to fix the vibrator to the rotary shaft. However, in any approach, it is difficult to positively fix the vibrator to the rotary shaft with a large force under the condition in which the vibrator is not rotated relative to the rotary shaft having the circular shape in cross-section. For this reason, there is a limit to the improvement in retaining force of the vibrator to the rotary shaft.

Also, in the case in which the rotary shaft is press-fitted and fixed in the hole of the vibrator, a large pressure is needed. As a result, there is a fear that a load would be applied to a motor body to cause adverse affects.

As another technique for an approach to the rotary shaft per se, in addition to the case in which the recess portion is formed around the entire circumference of the rotary shaft as described above, there is a case in which knurled mesh is applied to the surface of the rotary shaft through a knurling method to thereby perform the mat finishing.

If this mat finishing is performed, the retaining force of the vibrator to the rotary shaft is rather enhanced but there is a demand for the technique to further enhance the retaining force. Also, in order to perform the above-described mat finishing, it is necessary to spend time, work and high cost with rather complicated steps.

By the way, in case of the miniature electric motor for generating vibration, one force in a thrust direction (in the center axis direction) and the other force in a rotational direction are applied between the rotary shaft and the vibrator. The force in the rotational direction is a force to rotate the rotary shaft relative to the vibrator round the center axis. The force in the thrust direction is a force to move the vibrator relative to the rotary shaft in the center axis direction. In this motor, since the vibrator having a large mass relative to the motor is rotated, the force in the rotational direction is much larger than the force in the thrust direction.

However, in each conventional technique described above, since the rotary shaft has a circular shape in cross-section, it is difficult to fix the vibrator to the rotary shaft with a large force under a relatively non-rotatable condition of the vibrator against the force of the rotational force.

SUMMARY OF THE INVENTION

In order to overcome the above-noted defects, an object of the present invention is to provide a miniature electric motor for generating vibration in which a vibrator may be positively fixed to a rotary shaft with a large retaining force under a relatively non-rotatable condition so as not to be moved in the thrust direction.

In order to attain this and other objects, according to the present invention, there is provided a miniature electric motor for generating vibration on which a vibrator is mounted on an output portion of a rotary shaft rotatably supported to a casing, wherein the output portion of the rotary shaft is formed into an irregular shape in cross-section other than a circular shape in cross-section, an engaging hole having a predetermined shape in cross-section, which corresponds to the irregular shape in cross-section of the output portion and which makes the vibrator to be kept under a relatively non-rotatable condition to the rotary shaft, is formed in the vibrator, and the output portion is engaged with the engaging hole and the vibrator is positioned and held in a thrust direction relative to the output portion to thereby fix the vibrator to the rotary shaft.

In the miniature motor for generating vibration in accordance with a preferred specific embodiment, the output portion of the rotary shaft is depressed from at least one side to form at least one flat surface portion in a longitudinal direction of the output portion, the engaging hole having the predetermined shape in cross-section corresponding to the irregular shape in cross-section of the output portion is formed in the vibrator, and the output portion is fitted in the engaging hole so that the vibrator is kept under the non-rotatable condition relative to the rotary shaft, and wherein a tip end portion of the output portion projecting from the engaging hole to the outside is depressed so that a part of the tip end portion is plastically deformed radially outwardly, and the vibrator is positioned and held in the thrust direction to the output portion by the tip end portion and a stepped portion formed at an end portion of the flat surface portion toward the casing, whereby the vibrator is fixed to the rotary shaft.

Preferably, both sides of the output portion are depressed so that the output portion is plastically deformed and a couple of flat surface portions are simultaneously formed in parallel with each other in a longitudinal direction of the output portion.

Incidentally, a couple of flat surface portions may be formed in parallel with each other on the output portion by machining.

Preferably, an end face of an tip end portion of the output portion is substantially flush with or somewhat retracted from a flat end face of the vibrator located away from the casing, and the end face is not projecting at least from the flat end face to the outside.

Preferably, under the condition in which the output portion is fitted in the engaging hole for a clearance fitting, a projecting portion of the vibrator in which the engaging hole is formed is depressed and plastically deformed, whereby an outer surface of the output portion and an inner surface of the engaging hole of the projecting portion are brought into intimate contact with each other.

Also, it is preferable that the output portion is press-fitted into the engaging hole under such a small pressure in which the vibrator does not fall apart.

It is preferable that the projecting portion provided to a body portion of the vibrator and provided with the engaging hole has a predetermined dimension in a center axis direction which is shorter than a full length of the vibrator in the center axis direction and the projecting portion is disposed in a position in the vicinity of the casing.

In another embodiment of the present invention, the projecting portion provided in a body portion of the vibrator and provided with the engaging hole has a predetermined dimension in a center axis direction which is shorter than a full length of the vibrator in the center axis direction and the projecting portion is disposed in a substantially central portion in the center axis direction of the body portion.

In one embodiment, the vibrator has symmetrical shape in the center axis direction, and if the vibrator is turned through 180 degrees and then is mounted on the rotary shaft, the same posture is obtained, therefore there is no orientation when the vibrator is to be mounted.

It is preferable that a projecting portion of the vibrator in which the engaging hole is formed is positioned and held in the thrust direction under the condition in which the projecting portion is supported between the stepped portion and the tip end portion of the output portion.

In another embodiment of the present invention, the engaging hole having a rectangular shape in cross-section is formed in the vibrator, one flat surface portion is formed in the output portion, and the flat surface portion is brought into contact with one inner surface of the engaging hole, and while the output portion is engaged with the engaging hole, the flat surface portion and the inner surface are brought into contact with each other whereby the vibrator is fixed to the rotary shaft under the relatively non-rotatable condition.

In still another embodiment of the present invention, the output portion has an ellipse shape in cross-section and the engaging hole has a rectangular shape in cross-section whereby the vibrator is fixed to the rotary shaft under the relatively non-rotatable condition.

Incidentally, wherein the output portion may have an oval figure in cross-section and the engaging hole has a rectangular shape in cross-section whereby the vibrator is fixed to the rotary shaft under the relatively non-rotatable condition. The output portion and the engaging hole may have a triangle shape in cross-section together whereby the vibrator is fixed to the rotary shaft under the relatively non-rotatable condition. The output portion and the engaging hole may have a rectangular shape in cross-section together whereby the vibrator is fixed to the rotary shaft under the relatively non-rotatable condition. The output portion may have a hexagonal shape in cross-section and the engaging hole has a rectangular shape in cross-section whereby the vibrator is fixed to the rotary shaft under the relatively non-rotatable condition.

Incidentally, an adhesive may be applied or impregnated into a gap between the output portion of the rotary shaft and the engaging hole of the vibrator whereby the vibrator is fixed to the rotary shaft.

In another embodiment, the tip end portion of the output portion is projected to the outside from the engaging hole of the vibrator, and an adhesive is applied to the tip end portion whereby the adhesive fixed to the tip end portion is retained at the projecting portion of the vibrator so that the vibrator is fixed to the rotary shaft so as not to move in the thrust direction.

Preferably, the vibrator is formed out of metal material selected from tungsten alloy, gold alloy and platinum alloy through a sintering method.

Incidentally, the tungsten alloy is selected from a W—Ni—Fe system, a W—Ni—Cu system and a W—Mo—Ni—Fe system.

In one embodiment, in the case in which the vibrator is formed through an injection molding, after fine powder of the metal material and binder are kneaded and pelletized, the mixture is formed by the injection molding and then the unnecessary binder is removed by sintering so that the vibrator is formed with high precision.

Preferably, a material of the rotary shaft is one selected from the group consisting of iron, copper and metal alloy thereof.

Also, it is preferable that a material of the rotary shaft is one selected from the group consisting of stainless steels and high carbon steel wire rods.

Preferably, the miniature electric motor is used in one selected from the group consisting of a mobile phone, a pager and a massager.

According to the present invention, as described above, the vibrator may be positively fixed to the rotary shaft with a large retaining force under a relatively non-rotatable condition so as not to be moved in the thrust direction.

BRIEF DESCRIPTION OF THE DRAWINGS

In the accompanying drawings:

FIGS. 1 to 7 are views showing examples of embodiments of the present invention.

DESCRIPTION OF THE PREFERRED EMBODIMENTS

Examples of embodiments of the present invention will now be described with reference to FIGS. 1 to 7.

First Embodiment

Figure 1:
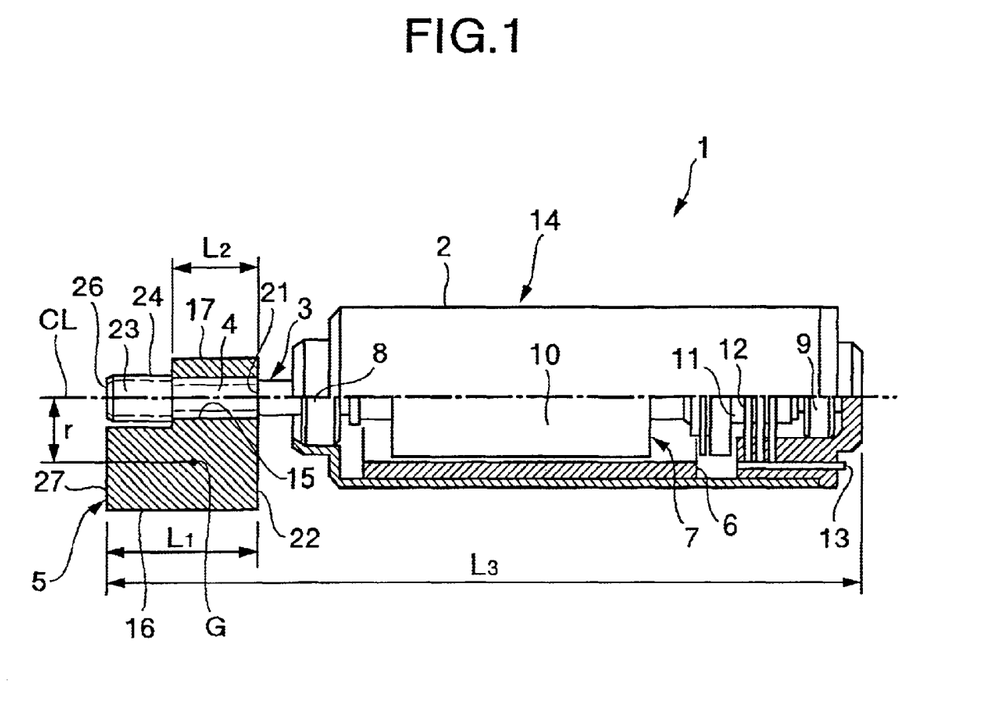
FIG. 1 is a side elevational cross-sectional view of a miniature electric motor for generating vibration in accordance with a first embodiment of the present invention.

FIG. 1 is a side elevational cross-sectional view of a miniature electric motor for generating vibration in accordance with a first embodiment of the present invention. FIGS. 2A to 2D are perspective views showing steps for mounting a vibrator to a rotary shaft of the motor shown in FIG. 1. FIGS. 3A to 3F are partial cross-sectional views showing respective shapes of an engaging hole of the vibrator and an output portion of the rotary shaft in the steps shown in FIGS. 2A to 2D.

As shown in FIG. 1 and FIGS. 2A to 2D, the miniature electric motor for generating vibration (hereinafter referred to as a motor) 1 is a DC motor in which a vibrator 5 is mounted on an output portion 4 of a rotary shaft 3 rotatably supported to a casing 2. The motor 1 is mounted in, for example, a portable type telecommunication device, such as a mobile phone (cellular phone) and a pager, or a massager.

First of all, an overall structure of the motor 1 will be described.

The motor 1 is provided with the casing 2 and a rotor 7 disposed in an interior of the casing 2. A pair of stators 6 are mounted on an inner circumferential surface of the casing 2. The rotary shaft 3 is rotatably supported to bearing portions 8 and 9 provided on the casing 2 and extends in a direction of a center axis CL.

The rotor 7 is provided with the rotary shaft 3, an armature 10 in which armature windings are wound in the form of a coil around an iron core mounted on the rotary shaft 3, and a commutator 11 mounted on the rotary shaft 3 and electrically connected to the armature windings.

Brushes 12 mounted on the casing 2 are slidingly engaged with the commutator 11. Power feed terminals 13 are electrically connected to the brushes 12. Thus, a motor body 14 in which the rotary shaft 3 projects from the casing 2 is constituted.

The vibrator 5 for generating vibration is mounted on the motor body 14 and is formed to have a substantially sector-shape in cross-section. A position of the center of gravity G of the vibrator 5 is eccentric from the rotational center to cause imbalance in the center of gravity to form the rotational imbalance.

The vibrator 5 has a body portion 16 having a substantially sector-shape in cross-section and has a projecting portion 17 provided integrally with or separately from the body portion 16. An engaging hole 15 into which the rotary shaft 3 is inserted is formed through the projecting portion 17.

The output portion 4 of the rotary shaft 3 is inserted in the engaging hole 15 to position and fix the vibrator 5 to the rotary shaft 3. The projecting portion 17 has a predetermined dimension L2, in a center axis direction CL, which is smaller than a full length L1 of the vibrator 5 in the center axis direction CL. The projecting portion 17 is arranged in the vicinity of the casing 2.

While an electric current is fed to the armature windings through the terminals 13, the brushes 12 and the commutator 11, the rotor 7 makes a rotary motion. Thus, the motor 1 rotates the vibrator 5 mounted on the rotary shaft 3.

The position of the center of gravity G of the vibrator 5 is eccentric from the center axis CL of the rotary shaft 3. Accordingly, while the vibrator 5 rotates, the rotational imbalance occurs due to the imbalance of the center of gravity G. Then, the vibration occurs in the rotational shaft 3 so that the motor 1 as a whole is vibrated. The motor 1 vibrates to thereby vibrate a mobile phone, and the like, to make it possible to page a specific person without generating sound.

The structure and the steps for fixing the vibrator 5 to the rotary shaft 3 will now be described.

Figure 2A:
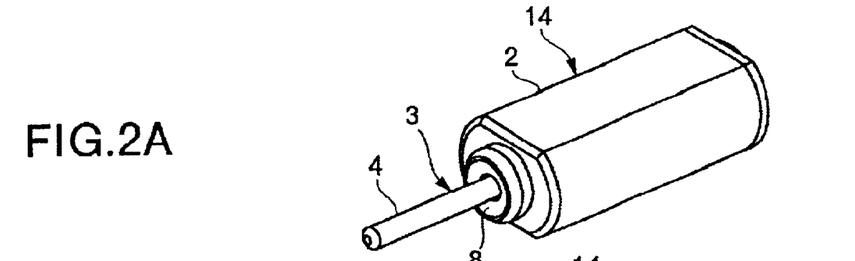
FIGS. 2A to 2D are perspective views showing steps for mounting a vibrator to a rotary shaft of the motor shown in FIG. 1.
Figure 2B:
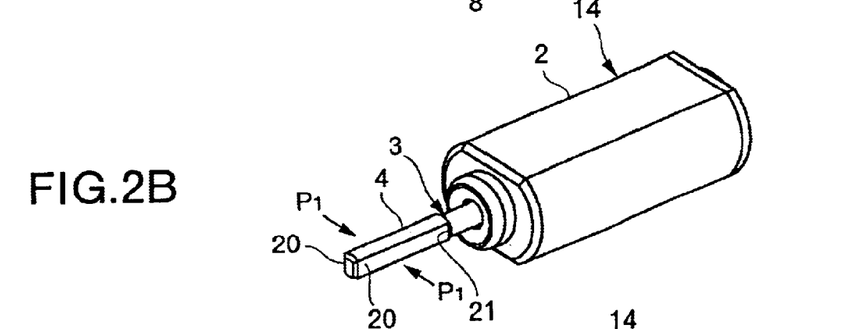
Figure 2C:
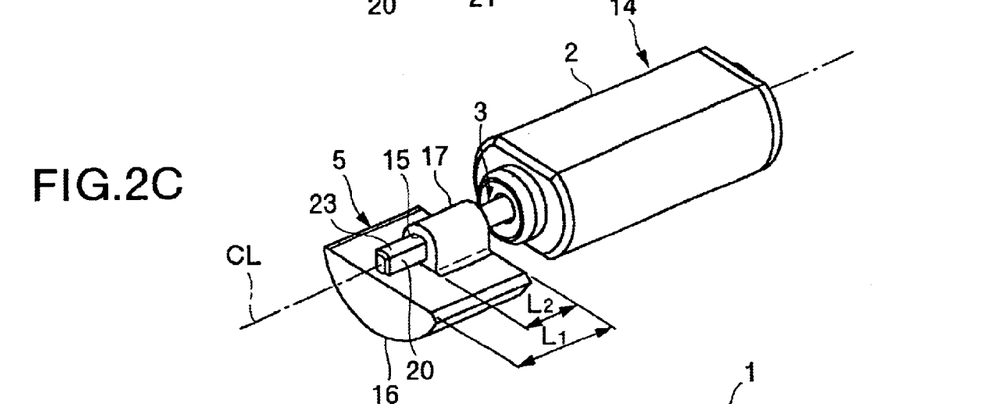
Figure 2D:
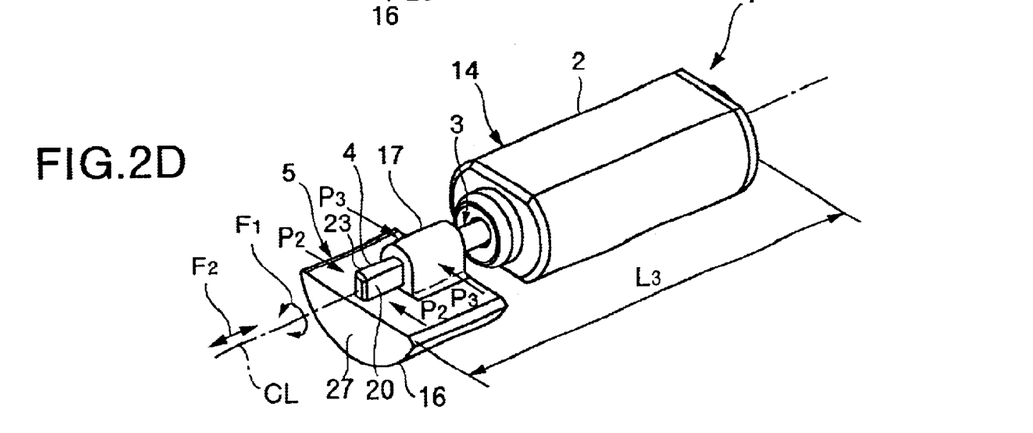
Figure 3A:
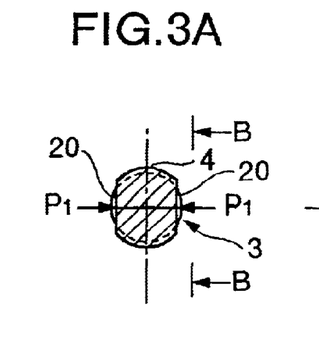
FIGS. 3A to 3F are partial cross-sectional views showing respective shapes of an engaging hole of the vibrator and an output portion of the rotary shaft in the steps shown in FIGS. 2A to 2D.
Figure 3B:
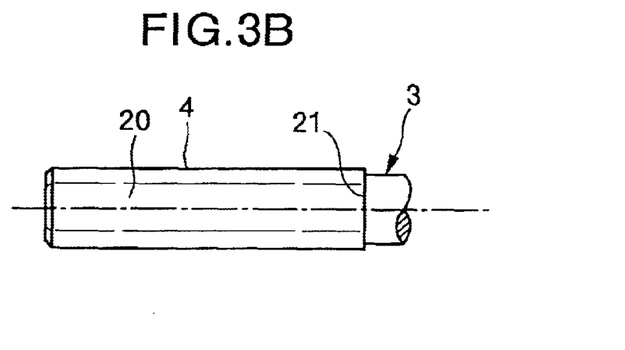
Figures 3C, 3D:
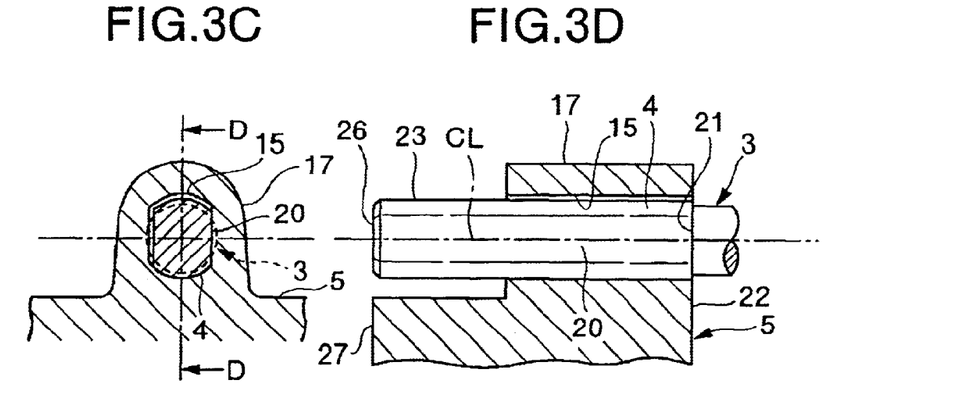
Figure 3E:
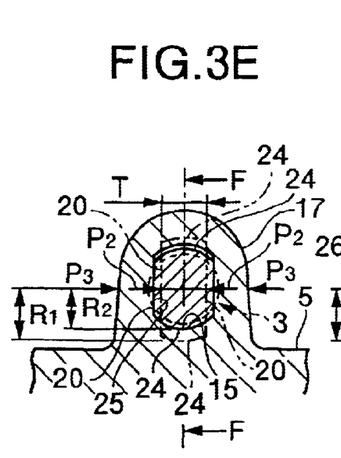
Figure 3F:
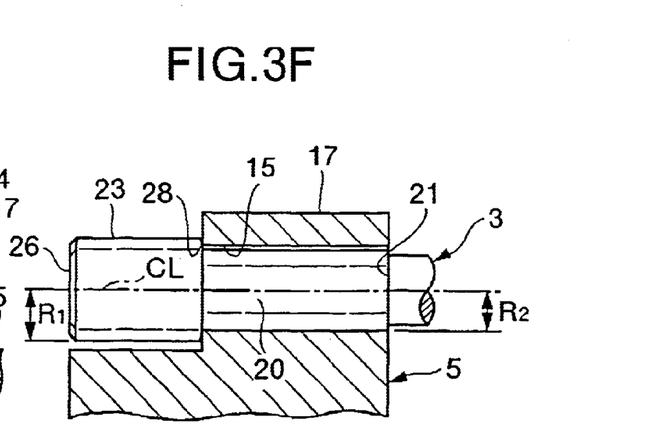

FIG. 3A is a cross-sectional view of the rotary shaft 3 shown in FIG. 2B, FIG. 3B is a view as viewed in the direction indicated by the arrows B—B of FIG. 3A, and FIG. 3C is a cross-sectional view of the rotary shaft 3 and the vibrator 5 shown in FIG. 2C. FIG. 3D is a cross-sectional view taken along the line D—D of FIG. 3C, FIG. 3E is a cross-sectional view of the rotary shaft 3 and the vibrator 5 shown in FIG. 2D, and FIG. 3F is a cross-sectional view taken along the line F—F of FIG. 3E.

As described above, conventionally, assuming that the rotary shaft has a circular shape in cross-section, in order to fix the vibrator to the rotary shaft, there have been a variety of approaches, such as plastically deforming the vibrator and so on. In contrast, as shown in FIG. 1 and FIGS. 2A to 2D, the present invention is based upon a novel concept for forming the output portion 4 of the rotary shaft 3 into an irregular shape in cross-section other than a circular shape in cross-section in order to fix the vibrator 5 to the rotary shaft 3.

On the other hand, the engaging hole 15 is formed in the vibrator 5. The engaging hole 15 has a predetermined shape in cross-section which corresponds to the irregular shape in cross-section of the rotary shaft 3 and which makes it possible to keep the vibrator 5 to the rotary shaft 3 under a relatively non-rotatable condition.

The output portion 4 is engaged with the engaging hole 15, and the vibrator 5 is positioned and held in a thrust direction (in the direction of the center axis CL) relative to the output portion 4. Thus, the vibrator 5 is fixed to the rotary shaft 3 so as not to move relative to the rotary shaft 3 under the relatively non-rotatable condition.

In order to increase the eccentric amount, the vibrator 5 is formed out of high specific gravity metal, for example tungsten alloy (specific gravity of about 15 to about 18 $g/cm^3$) such as a W—Ni—Fe system, a W—Ni—Cu system, a W—Mo—Ni—Fe system and the like, gold alloy, platinum alloy and the like, through a sintering method and the like.

If the rotary shaft 3 is formed out of metal material which has a high toughness, it is possible to easily form the output portion 4 into the irregular shape in cross-section. Accordingly, it is preferable to use as the material of the rotary shaft 3, for example, stainless steels such as SUS304, SUS201 and the like or high carbon steel wire rods such as SWRH-60, SWRH-80 and the like. These kinds of material preferably may be plastically deformed and have high strength. The material of the rotary shaft 3 may be iron, copper or any other alloy of these kinds of metal.

In the steps for fixing the vibrator 5 to the rotary shaft 3, first of all, as shown in FIGS. 1 and 2A, the motor body 14, which has been assembled, and the vibrator 5 are prepared. Subsequently, the output portion 4 of the rotary shaft 3 is depressed in at least one direction to thereby form at least one flat surface portion 20 in a longitudinal direction of the output portion 4.

As shown in FIG. 2B and FIGS. 3A and 3B, in the embodiment, the output portion 4 is depressed in opposite directions by a press (as shown in the directions indicated by the arrows P1). Thus, the output portion 4 is plastically deformed to form a couple of flat surface portions 20 in parallel with each other in the longitudinal direction of the output portion 4. At the same time, stepped portions 21 are formed in the output portion 4. The stepped portions 21 are located at end portions in the direction toward the casing 2 of the flat surface portions 20. Incidentally, the number of the flat surface portion may be one.

As shown in FIG. 2C and FIGS. 3C and 3D, the engaging hole 15, which has the predetermined shape in cross-section and corresponds to the irregular shape in cross-section of the output portion 4, is formed in the vibrator 5 in advance. The cross-sectional shape of the engaging hole 15 according to this embodiment is substantially the same as the cross-sectional shape of the output portion 4. The output portion 4 may be loosely engaged with the engaging hole 15 for a clearance fitting.

Subsequently, the output portion 4 is inserted into the engaging hole 15 and an end face 22 of the vibrator 5 toward the casing 2 is brought into contact with the stepped portions 21 of the output portion 4. Thus, the vibrator 5 is held under the non-rotatable condition relative to the rotary shaft 3. Also, the vibrator 5 is positioned in the direction toward the casing 2 (in one direction of the thrust direction). Under this condition, a tip end portion 23 of the output portion 4 projects from the engaging hole 15 to the outside.

An end face 26 of the tip end portion 23 is substantially flush with or retracted from a flat end face 27 of the vibrator 5 located away from the casing 2. Namely, the end face 26 is not projecting to the outside at least from the flat end face 27.

Subsequently, as shown in FIG. 2D and FIGS. 3E and 3F, the flat surface portions 20 of the tip end portion 23 are further depressed by means of a press and the like (see arrows P2). Then, the tip end portion 23 is plastically deformed. Namely, a thickness dimension T between the opposite flat surface portions 20 is decreased and at the same time, curved surface portions (parts of the tip end portion 23) 24 are plastically deformed radially outwardly.

Thus, a radius R1 of the curved surface portions 24 of the tip end portion 23 is greater than a radius R2 of the engaging hole 15 corresponding to the curved surface portions 24. Then, the tip end portion 23 is retained at an opening edge portion 28. As a result, the vibrator 5 is positioned and held in the thrust direction to the output portion 4 under the condition in which the vibrator 5 is supported between the tip end portion 23 of the output portion 4 and the stepped portions 21 thereof.

Thus, the vibrator 5 is positively fixed to the rotary shaft 3 with a large retaining force so as not to move relative to the rotary shaft 3 in the thrust direction under the relatively non-rotatable condition. Accordingly, the motor 1 may stand sufficiently against the vibration.

The output portion 4 is fitted in the engaging hole 15 for the clearance fitting. As a result, the vibrator 5 might be somewhat moved relative to the rotary shaft 3. Therefore, it is preferable to depress the projecting portion 17 in a direction close to each other from the opposite sides and to plastically deform the projecting portion 17, as indicated by the arrows P3 in FIG. 3E, under the condition in which the output portion 4 is engaged with the engaging hole 15.

Thus, it is possible to bring the outer surface (the flat surface portions 20 in this case) of the output portion 4 into intimate contact with the inner surface 25 of the engaging hole 15. As a result, a gap between the output portion 4 and the engaging hole 15 is eliminated so that the projecting portion 17 is fixed to the output portion 4. Accordingly, there is no fear that the vibrator 5 would move relative to the rotary shaft 3.

The purpose of the plastic deformation of the projecting portion 17 is to eliminate the above-described gap between the output portion 4 and the engaging hole 15. Accordingly, it is unnecessary to enter the crimped portion into the rotary shaft to enhance the retaining strength by crimping the vibrator as in the conventional case.

Also, since the above-described gap is very fine, it is sufficient to slightly plastically deform the projecting portion 17. Accordingly, if the vibrator 5 is formed out of sintered alloy and the like, there is no fear that the projecting portion 17 would be cracked.

According to the above-described steps, the motor 1 with the structure shown in FIGS. 1 and 2D has been completed. Incidentally, the output portion 4 may be press-fitted in the engaging hole 15.

According to the present invention, since the output portion 4 has no circular shape in cross-section, the vibrator 5 no longer rotates relative to the rotary shaft 3. Accordingly, the large press-fitting force as in the conventional case is dispensed with. It is sufficient to press-fit the output portion 4 in the engaging hole 15 under such a slight insertion pressure in which the vibrator 5 will not fall apart.

In addition, in the case in which the above-described gap is fine so that there is no fear that the vibrator 5 would move relative to the rotary shaft 3 and in the case in which the output portion 4 is press-fitted in the engaging hole 15, it is unnecessary to perform the above-described step for plastically deforming the projecting portion 17.

In this embodiment, the projecting portion 17 has a predetermined dimension L2, in the center axis direction, which is smaller than the full length L1 of the vibrator 5 and the projecting portion 17 is disposed in the vicinity of the casing 2. Thus, the tip end portion 23 of the output portion 4 to be plastically deformed is received in a space for the vibrator 5.

Namely, there is no fear that the end face 26 of the rotary shaft 3 projects outwardly from the vibrator 5 in the direction of the center axis CL. Accordingly, the full length L3 of the motor 1 including the vibrator 5 is not elongated. Also, the tip end portion 23 of the rotary shaft 3 no longer serves as any obstruction.

By the way, as shown in FIG. 1 and FIGS. 3A to 3F, the force F1 in the rotational direction round the center axis CL and the force F2 in the thrust direction in parallel with the center axis CL are applied between the rotary shaft 3 and the vibrator 5 (see FIG. 2D). In general, the force F1 in the rotational direction is much greater than the force F2 in the thrust direction.

The output portion 4 and the engaging hole 15 have the irregular shape in cross-section other than a circular shape in cross-section. Accordingly, if the large force F1 in the rotational direction is applied between the rotary shaft 3 and the vibrator 5, the vibrator 5 is fixed to the rotary shaft 3 in the rotational direction with a large retaining force, so far as either one or both of the rotary shaft 3 and the vibrator 5 are not destroyed.

Also, the stepped portions 21 are formed in the vicinity of the casing 2 in the rotary shaft 3. The parts (curved surface portions 24) of the tip end portion 23 located away from the casing 2 are plastically deformed radially outwardly. Thus, the projecting portion 17 is positioned and held in the thrust direction under the condition in which the projecting portion 21 is supported between the stepped portions 21 and the tip end portion 23.

Accordingly, it is possible to positively fix the vibrator 5 to the rotary shaft 3 with a large retaining force so as not to move the vibrator 5 in both directions of the thrust direction relative to the rotary shaft 3. If the force F2 in the thrust direction is applied to the vibrator 5, there is no fear that the vibrator 5 would move in the thrust direction.

The press is used to depress both sides of the output portion 4 in the direction as indicated by the arrows P1 to plastically deform the output portion 4. Accordingly, it is possible to form simultaneously the couple of flat surface portions 20 in low cost with ease. Incidentally, it is possible to form the flat surface portions 20 in parallel with each other on the output portion 4 by machining.

The vibrator 5 may be formed by an injection molding. In the injection molding, after fine powder of the metal material, such as tungsten alloy, and binder have been kneaded and pelletized, the mixture is formed by the injection molding. Finally the unnecessary binder is removed by sintering. Thus, the vibrator 5 may be formed with high precision.

According to the injection molding, it is possible to minimize the gap between the engaging hole 15 and the output portion 4. Accordingly, it is possible to dispense with the step for depressing and plastically deforming the projecting portion 17 as indicated by the arrows P3.

In the case in which the output portion 4 is fitted in the engaging hole 15 for the clearance fitting, no load is applied to the motor body 14 when the output portion 4 is inserted into the engaging hole 15, unlike press-fitting. Accordingly, there is no fear of adverse affects to the motor body 14.

In the case in which the output portion 4 and the engaging hole 15 are fitted with each other for the clearance fitting, it is unnecessary to enhance the dimensional precision to a high level when the flat surface portions 20 are formed in the longitudinal direction of the output portion 4. Accordingly, it is easy to administrate the step for forming the flat surface portions 20.

The amount of vibration generated by the rotation of the vibrator may be given by the centrifugal force f represented by the following formula.

$$f = mr\omega^2$$

in which f is the centrifugal force,
m is a mass of the vibrator,
r is a distance from the center of rotation to the center of gravity of the vibrator, and
ω is an angular velocity.

As is apparent from this formula, in the case in which the mass m of the vibrator and the angular velocity ω are kept constant, the vibration amount (corresponding to the centrifugal force f) is in proportion to the distance r from the center of rotation to the center of gravity of the vibrator. In the vibrator 5 according to the present embodiment, the dimension L2 in the center axis direction of the projecting portion 17 is smaller than the full length L1 of the vibrator 5.

Since the projecting portion 17 is originally adapted to surround the rotational center CL, the projecting portion 17 has almost no contribution to the vibration amount. Accordingly, in order to increase the vibration amount, the smaller the mass of the projecting portion 17, the longer the distance r between the center of gravity G of the vibrator 5 and the rotational center CL.

In view of these points, since the projecting portion 17 according to this embodiment has the small mass, it will be understood that the position of the center of gravity G is positioned away from the center axis CL and the distance r is elongated. Accordingly, from the above-described formula, the large centrifugal force f (i.e., the vibration amount) may be generated.

Second Embodiment

Figure 4A:
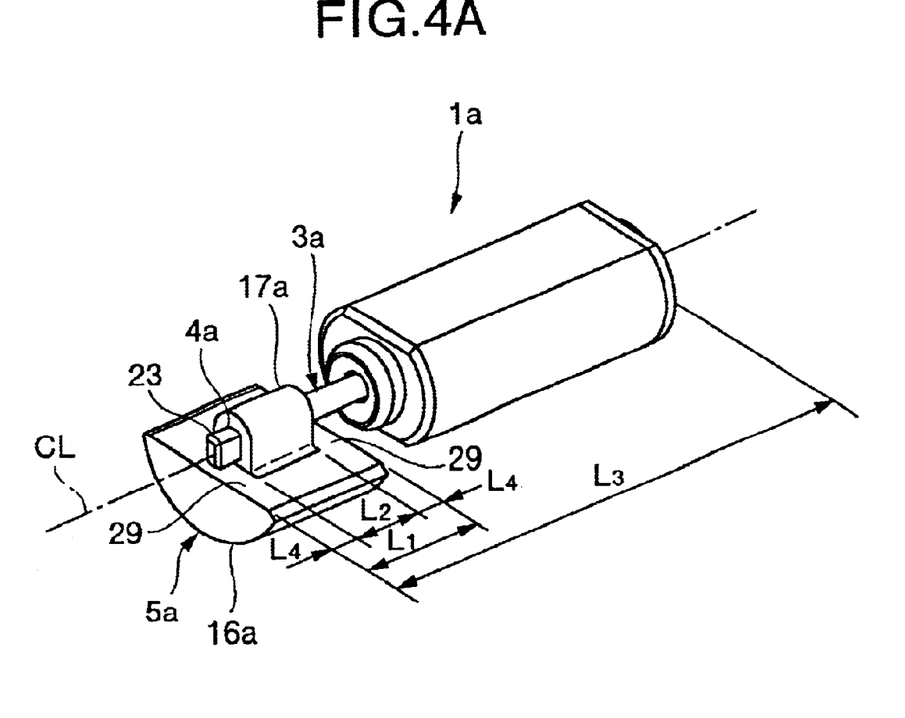
FIGS. 4A and 4B are views showing a miniature electric motor for generating vibration in accordance with a second embodiment of the present invention.
Figure 4B:
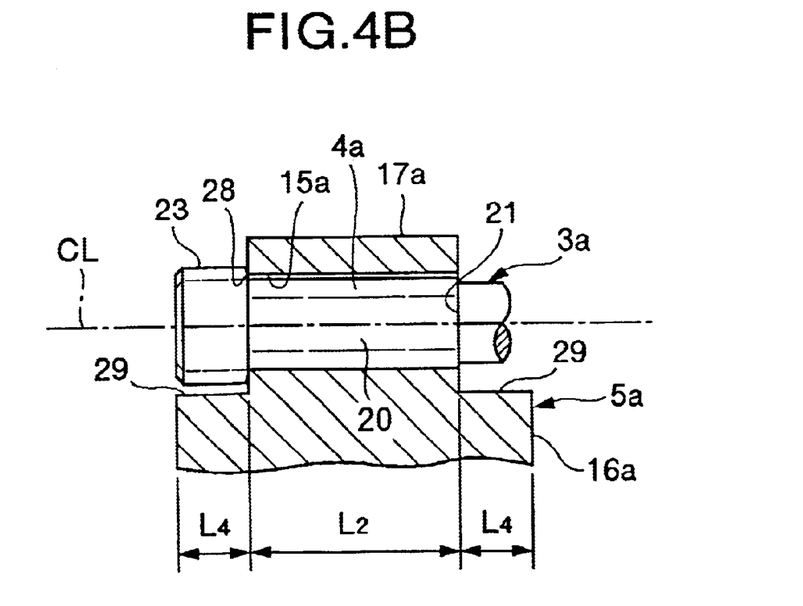

FIGS. 4A and 4B are views showing a miniature electric motor 1a for generating vibration in accordance with a second embodiment of the present invention. FIG. 4A corresponds to FIG. 2D and is a perspective view of the motor 1a. FIG. 4B corresponds to FIG. 3F and is a partial cross-sectional view of a vibrator 5a and an engaging hole 15a.

Incidentally, in these drawing, the same reference numerals are used to indicate the corresponding components or the same components as those of the first embodiment. The explanation will be given only for the different portions.

In the motor 1a shown in FIGS. 4A and 4B, the vibrator 5a is mounted on an output portion 4a of a rotary shaft 3a. A projecting portion 17a of the vibrator 5a is provided with the engaging hole 15a and provided in a body portion 16a. The projecting portion 17a has a predetermined dimension L2 in the center axis direction shorter than the full length L1 of the vibrator 5a in the direction of the center axis CL.

The projecting portion 17a is disposed substantially in a central portion in the direction of the center axis CL of the body portion 16a. Extension portions 29 are provided respectively on both sides in the direction of the center axis CL of the projecting portion 17a. Two dimensions L4 in the center axis of the two extension portions 29 have substantially the same dimension. The other structure of the motor 1a is substantially the same as that of the motor 1 according to the first embodiment.

The vibrator 5a has a symmetrical shape in the direction of the center axis CL. If the vibrator 5a is turned through 180 degrees and then is mounted on the rotary shaft 3a, the same posture may be obtained. Therefore, there is no orientation when the vibrator 5a is to be mounted. Accordingly, when the vibrator 5a is mounted on the rotary shaft 3a, the workability is enhanced. Also, this system of the second embodiment has the same resultant effect as that of the first embodiment.

Modifications of First and Second Embodiments

FIGS. 5A to 5F correspond to FIG. 3C and are partial cross-sectional views showing a variety of modifications of a shape of an output portion of the rotary shaft 3, 3a and an engaging hole of a vibrator.

In the rotary shaft 3, 3a shown in FIGS. 5A to 5F, an output portion 4b is formed in an irregular shape in cross-section other than a circular shape in cross-section. An engaging hole 15b is formed in the vibrator 5b. The engaging hole 15b has a predetermined shape in cross-section which corresponds to the irregular shape of the output portion 4b and which may keep the vibrator 5b under the non-rotatable condition relative to the rotary shaft 3, 3a.

Figure 5A:
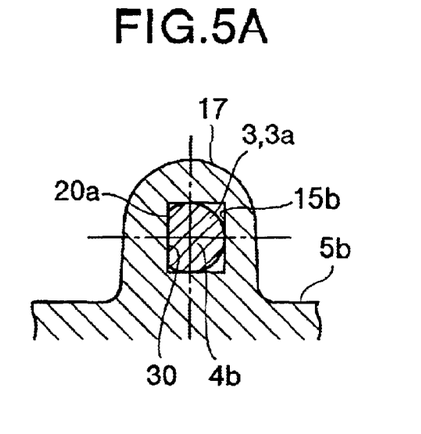
FIGS. 5A to 5F are partial cross-sectional views showing respective modifications of the shapes of the output portion of the rotary shaft and the engaging hole of the vibrator.

For example, as shown in FIG. 5A, the engaging hole 15b having a rectangular shape in cross-section is formed in the vibrator 5b and a single flat surface portion 20a may be formed on the output portion 4b. The flat surface portion (outer surface of the output portion 4b) 20a may be brought into contact with one of the inner surfaces 30 of the engaging hole 15b. While the output portion 4b is engaged with the engaging hole 15b, the flat surface portion 20a and the inner surface 30 are brought into intimate contact with each other. Thus, the vibrator 5b is fixed to the rotary shaft 3, 3a under the relatively non-rotatable condition.

Figure 5B:
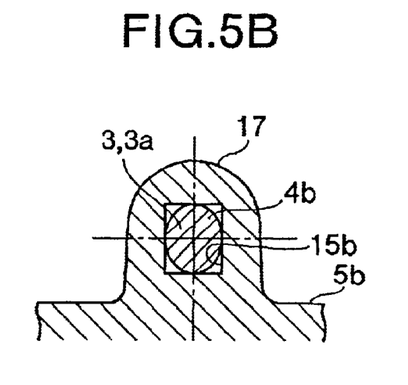
Figure 5C:
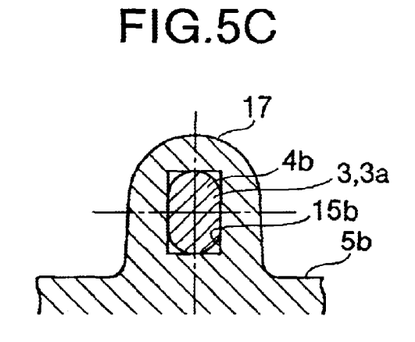
Figure 5D:
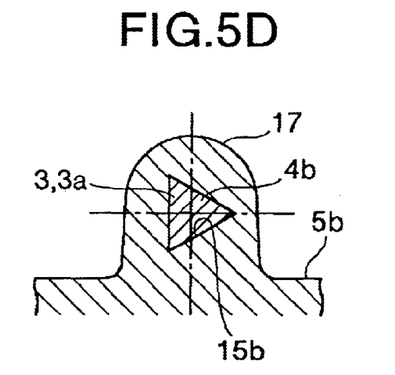
Figure 5E:
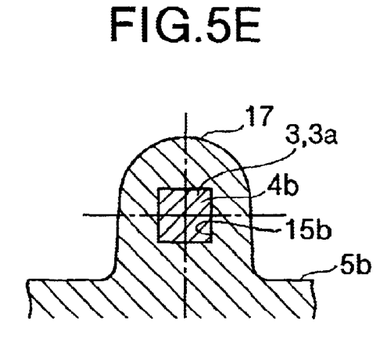
Figure 5F:
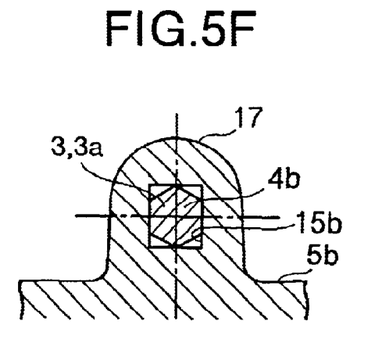

FIG. 5B shows the case in which the output portion 4b has an ellipse shape in cross-section and the engaging hole 15b has a rectangular shape in cross-section, FIG. 5C shows the case in which the output portion 4b has an oval figure in cross-section and the engaging hole 15b has a rectangular shape in cross-section, FIG. 5D shows the case in which the output portion 4b and the engaging hole 15b have a triangular shape in cross-section together, FIG. 5E shows the case in which the output portion 4b and the engaging hole 15b have a rectangular shape in cross-section together, and FIG. 5F shows the case in which the output portion 4b has a hexagonal shape in cross-section and the engaging hole 15b has a rectangular shape in cross-section, respectively. Thus, the vibrator 5b is fixed to the rotary shaft 3, 3a under the relatively non-rotatable condition.

Also in the case of the examples shown in FIGS. 5A to 5F, the output portion 4b of the rotary shaft 3, 3a is fitted in the engaging hole 15b for the clearance fitting. Thereafter, the projecting portion 17 of the vibrator 5b in which the engaging hole 15b is formed is depressed and plastically deformed. Thus, the outer surface of the output portion 4b and the inner surface of the engaging hole 15b are brought into intimate contact with each other. As a result, it is possible to obtain substantially the same resultant effect as that of the first embodiment.

Figure 6:
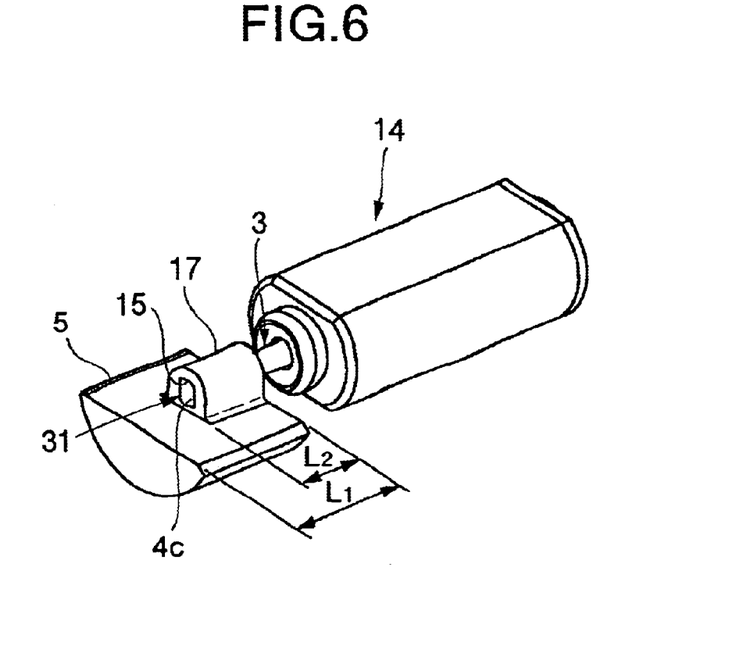
FIG. 6 is a perspective view showing a modification of a means for fixing the vibrator to the rotary shaft in a thrust direction.
Figure 7:
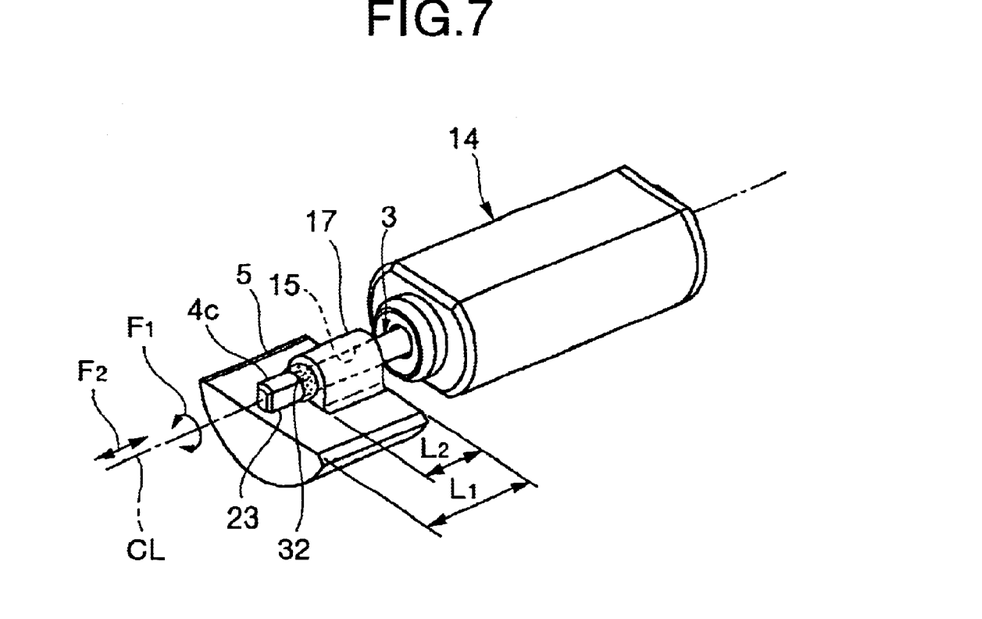
FIG. 7 is a perspective view showing another modification of a means for fixing the vibrator to the rotary shaft in the thrust direction.

FIGS. 6 and 7 are perspective views showing modifications of a means for fixing the vibrator to the rotary shaft in the thrust direction.

In FIGS. 6 and 7, the cross-sectional shapes of an output portion 4c and the engaging hole 15 are the same as that of the first and second embodiments. As shown in FIG. 6, an adhesive 31 is applied or impregnated into a gap between the output portion 4c of the rotary shaft 3 and the engaging hole 15 of the vibrator 5, therefore the vibrator 5 is fixed to the rotary shaft 3.

As shown in FIG. 7, the tip end portion 23 of the output portion 4c is projected to the outside from the engaging hole 15 of the vibrator 5 and an adhesive 32 may be applied to the tip end portion 23. Thus, the adhesive 32 fixed to the tip end portion 23 is retained at the projecting portion 17. As a result, it is possible to fix the vibrator 5 to the rotary shaft 3 so as not to move in the thrust direction.

As described above, the force F2 in the thrust direction applied between the vibrator and the rotary shaft is much smaller than the force F1 in the rotational direction. Accordingly, it is possible to fix the vibrator 5 to the output portion 4c in the thrust direction even with the fastening means shown in FIGS. 6 and 7.

In the examples shown in FIGS. 6 and 7, since it is unnecessary to plastically deform the tip end portion of the output portion 4c, it is possible to dispense with this step. Also, it is possible to obtain the same resultant effect as that of the first and second embodiments.

Incidentally, the same reference numerals are used to indicate the like components or members throughout the accompanying drawings.

Various details of the invention may be changed without departing from its scope. Furthermore, the foregoing description of the embodiments according to the present invention is provided for the purpose of illustration only, and not for the purpose of limiting the invention as defined by the appended claims and their equivalents.

What is claimed is:

1. A miniature electric motor for generating vibration on which a vibrator is mounted on an output portion of a rotary shaft rotatably supported to a casing, wherein said output portion of said rotary shaft is formed into an irregular shape in cross-section other than a circular shape in cross-section, an engaging hole having a predetermined shape in cross-section, which corresponds to said irregular shape in cross-section of said output portion and which makes said vibrator to be kept under a relatively non-rotatable condition to said rotary shaft, is formed in said vibrator, and said output portion is engaged with said engaging hole and a tip end portion of said output portion projecting from said engaging hole to the outside is depressed so that a part of said tip end portion is plastically deformed radially outwardly, and said vibrator is positioned and held in the thrust direction to said output portion by said tip end portion and a stepped portion formed at an end portion of said flat surface portion toward said casing, whereby said vibrator is fixed to said rotary shaft.

2. The miniature electric motor according to claim 1, wherein said output portion of said rotary shaft is depressed from at least one side to form at least one flat surface portion in a longitudinal direction of said output portion, said engaging hole having said predetermined shape in cross-section corresponding to said irregular shape in cross-section of said output portion is formed in said vibrator, and said output portion is fitted in said engaging hole so that said vibrator is kept under the non-rotatable condition relative to said rotary shaft.

3. The miniature electric motor according to claim 1, wherein both sides of said output portion are depressed so that said output portion is plastically deformed and a couple of flat surface portions are simultaneously formed in parallel with each other in a longitudinal direction of said output portion.

4. The miniature electric motor according to claim 1, wherein a couple of flat surface portions are formed in parallel with each other on said output portion by machining.

5. The miniature electric motor according to claim 1, wherein an end face of an tip end portion of said output portion is substantially flush with or somewhat retracted from a flat end face of said vibrator located away from said casing, and said end face is not projecting at least from said flat end face to the outside.

6. The miniature electric motor according to claim 1, wherein under the condition in which said output portion is fitted in said engaging hole for a clearance fitting, a projecting portion of said vibrator in which said engaging hole is formed is depressed and plastically deformed, whereby an outer surface of said output portion and an inner surface of said engaging hole of said projecting portion are brought into intimate contact with each other.

7. The miniature electric motor according to claim 1, wherein said output portion is press-fitted into said engaging hole under such a small pressure in which said vibrator does not fall apart.

8. The miniature electric motor according to claim 1, wherein said projecting portion provided to a body portion of said vibrator and provided with said engaging hole has a predetermined dimension in a center axis direction which is shorter than a full length of said vibrator in the center axis direction and said projecting portion is disposed in a position in the vicinity of said casing.

9. The miniature electric motor according to claim 1, wherein said projecting portion provided in a body portion of said vibrator and provided with said engaging hole has a predetermined dimension in a center axis direction which is shorter than a full length of said vibrator in the center axis direction and said projecting portion is disposed in a substantially central portion in the center axis direction of said body portion.

10. The miniature electric motor according to claim 9, wherein said vibrator has symmetrical shape in the center axis direction, and if the vibrator is turned through 180 degrees and then is mounted on said rotary shaft, the same posture is obtained, therefore there is no orientation when said vibrator is to be mounted.

11. The miniature electric motor according to claim 2, wherein a projecting portion of said vibrator in which said engaging hole is formed is positioned and held in the thrust direction under the condition in which said projecting portion is supported between said stepped portion and said tip end portion of said output portion.

12. The miniature electric motor according to claim 1, wherein said engaging hole having a rectangular shape in cross-section is formed in said vibrator, one flat surface portion is formed in said output portion, and said flat surface portion is brought into contact with one inner surface of said engaging hole, and while said output portion is engaged with said engaging hole, said flat surface portion and said inner surface are brought into contact with each other whereby said vibrator is fixed to said rotary shaft under the relatively non-rotatable condition.

13. The miniature electric motor according to claim 1, wherein said output portion has an ellipse shape in cross-section and said engaging hole has a rectangular shape in cross-section whereby said vibrator is fixed to said rotary shaft under the relatively non-rotatable condition.

14. The miniature electric motor according to claim 1, wherein said output portion has an oval figure in cross-section and said engaging hole has a rectangular shape in cross-section whereby said vibrator is fixed to said rotary shaft under the relatively non-rotatable condition.

15. The miniature electric motor according to claim 1, wherein said output portion and said engaging hole have a triangle shape in cross-section together whereby said vibrator is fixed to said rotary shaft under the relatively non-rotatable condition.

16. The miniature electric motor according to claim 1, wherein said output portion and said engaging hole have a rectangular shape in cross-section together whereby said vibrator is fixed to said rotary shaft under the relatively non-rotatable condition.

17. The miniature electric motor according to claim 1, wherein said output portion has a hexagonal shape in cross-section and said engaging hole has a rectangular shape in cross-section whereby said vibrator is fixed to said rotary shaft under the relatively non-rotatable condition.

18. The miniature electric motor according to claim 1, wherein an adhesive is applied or impregnated into a gap between said output portion of said rotary shaft and said engaging hole of said vibrator whereby said vibrator is fixed to said rotary shaft.

19. The miniature electric motor according to claim 1, wherein said tip end portion of said output portion is projected to the outside from said engaging hole of said vibrator, and an adhesive is applied to said tip end portion whereby said adhesive fixed to said tip end portion is retained at the projecting portion of said vibrator so that said vibrator is fixed to said rotary shaft so as not to move in the thrust direction.

20. The miniature electric motor according to claim 1, wherein said vibrator is formed out of metal material selected from tungsten alloy, gold alloy and platinum alloy through a sintering method.

21. The miniature electric motor according to claim 20, wherein said tungsten alloy is selected from a W—Ni—Fe system, a W—Ni—Cu system and a W—Mo—Ni—Fe system.

22. The miniature electric motor according to claim 20, wherein in the case in which said vibrator is formed through an injection molding, after fine powder of said metal material and binder are kneaded and pelletized, the mixture is formed by the injection molding and then the unnecessary binder is removed by sintering so that said vibrator is formed with high precision.

23. The miniature electric motor according to claim 1, wherein a material of said rotary shaft is one selected from the group consisting of iron, copper and metal alloy thereof.

24. The miniature electric motor according to claim 1, wherein a material of said rotary shaft is one selected from the group consisting of stainless steels and high carbon steel wire rods.

* * * * *